US010265918B2

United States Patent
Thomfohrde et al.

(10) Patent No.: US 10,265,918 B2
(45) Date of Patent: Apr. 23, 2019

(54) SYSTEM AND METHOD FOR MAKING A CARCASS FOR A PNEUMATIC VEHICLE TIRE

(71) Applicant: Continental Reifen Deutschland GmbH, Hannover (DE)

(72) Inventors: Claudia Thomfohrde, Leiferde (DE); Sebastian Reitmann, Hagenburg (DE); Stefan Linne, Wedemark (DE); Ewald Kneussel, Barsinghausen (DE); Christian Moeller, Rodenberg (DE)

(73) Assignee: Continental Reifen Deutschland GmbH, Hannover (DE)

( * ) Notice: Subject to any disclaimer, the term of this patent is extended or adjusted under 35 U.S.C. 154(b) by 196 days.

(21) Appl. No.: 14/880,838

(22) Filed: Oct. 12, 2015

(65) Prior Publication Data

US 2016/0031175 A1 Feb. 4, 2016

Related U.S. Application Data

(63) Continuation of application No. PCT/EP2014/052276, filed on Feb. 6, 2014.

(30) Foreign Application Priority Data

Apr. 11, 2013 (DE) ................. 10 2013 103 633

(51) Int. Cl.
*B29D 30/72* (2006.01)
*B29D 30/26* (2006.01)
(Continued)

(52) U.S. Cl.
CPC ......... *B29D 30/72* (2013.01); *B29D 30/2607* (2013.01); *B29D 30/3014* (2013.01); *B29D 30/3028* (2013.01); *B29D 2030/202* (2013.01)

(58) Field of Classification Search
CPC .... B29D 30/20; B29D 30/242; B29D 30/246; B29D 30/2607; B29D 30/3014; B29D 30/32; B29D 30/72; B29D 2030/241
See application file for complete search history.

(56) References Cited

U.S. PATENT DOCUMENTS

| 4,684,422 A | * | 8/1987 | Roedseth | .......... B29D 30/2607 156/126 |
| 5,010,938 A | * | 4/1991 | Assaad | ................... B60C 15/04 152/539 |

(Continued)

FOREIGN PATENT DOCUMENTS

| DE | 102011050456 | * 11/2012 | ............. B29D 30/32 |
| EP | 2 386 406 A1 | 11/2011 | |

(Continued)

OTHER PUBLICATIONS

Machine generated English language translation of JP 2004-122658 (original document dated Apr. 2004).*

(Continued)

*Primary Examiner* — Timothy Kennedy
(74) *Attorney, Agent, or Firm* — Walter Ottesen, P.A.

(57) ABSTRACT

A method for making a carcass for a pneumatic vehicle tire includes building up a carcass free from sidewalls with an inner liner, a single-ply or multi-ply carcass inlay and bead cores, at a carcass station on a carcass building drum, while creating ply turnups. The carcass produced without sidewalls is transferred to a transfer device. The carcass is kept on the transfer device while applying sidewalls to the carcass. The carcass is retained on the transfer device while transferring the carcass provided with the sidewalls to a shaping machine where the carcass is shaped into a toroidal shape.

7 Claims, 10 Drawing Sheets

(51) Int. Cl.
     *B29D 30/30*    (2006.01)
     *B29D 30/20*    (2006.01)

(56)              References Cited

U.S. PATENT DOCUMENTS

| 5,411,626 | A | 5/1995 | Coretta et al. | |
|---|---|---|---|---|
| 6,039,826 | A | 3/2000 | Okada | |
| 6,475,319 | B1 * | 11/2002 | Akiyama | B29D 30/20 156/111 |
| 7,520,949 | B2 * | 4/2009 | Ogawa | B29D 30/20 156/110.1 |
| 2002/0108716 | A1 * | 8/2002 | Lacagnina | B29D 30/36 156/416 |
| 2004/0194871 | A1 * | 10/2004 | Caretta | B29D 30/00 156/111 |
| 2007/0023122 | A1 * | 2/2007 | Moriguchi | G01M 17/02 156/64 |
| 2007/0284029 | A1 | 12/2007 | Lacagnina | |
| 2008/0190562 | A1 * | 8/2008 | Winkler | B29D 30/20 156/396 |
| 2009/0250156 | A1 | 10/2009 | Bigogno et al. | |
| 2010/0212812 | A1 | 8/2010 | Ogawa | |

FOREIGN PATENT DOCUMENTS

| JP | 6-270288 A | | 9/1994 | |
|---|---|---|---|---|
| JP | 2000-108222 A | | 4/2000 | |
| JP | 2004-122658 | * | 4/2004 | B29D 30/30 |
| WO | 2012156147 A1 | | 11/2012 | |

OTHER PUBLICATIONS

Machine generated English language translation of DE 102011050456 (original document dated Nov. 2012).*

International Search Report dated May 8, 2014 of international application PCT/EP2014/052276 on which this application is based.

* cited by examiner

SYSTEM AND METHOD FOR MAKING A CARCASS FOR A PNEUMATIC VEHICLE TIRE

CROSS REFERENCE TO RELATED APPLICATIONS

This application is a continuation application of international patent application PCT/EP2014/052276, filed Feb. 6, 2014, designating the United States and claiming priority from German application 10 2013 103 633.3, filed Apr. 11, 2013, and the entire content of both applications is incorporated herein by reference.

FIELD OF THE INVENTION

The invention relates to a method for making a carcass for a pneumatic vehicle tire. The tire is assembled with a belt assembly and a tread rubber to form the finished green tire. The method includes the steps of:
building up a carcass free from sidewalls with an inner liner, a single-ply or multi-ply carcass inlay, bead cores, in particular with bead fillers, at a carcass station on a carcass building drum, while creating the ply turnups;
applying the sidewalls to the carcass;
transferring the carcass provided with the sidewalls to a shaping machine; and,
shaping the carcass into a toroidal shape.

The invention furthermore relates to a system for making a carcass for a pneumatic vehicle tire, which is assembled with a belt assembly and a tread rubber to form the finished green tire, having a carcass station including a carcass machine and a carcass building drum, and an apparatus for the separate application of the sidewalls, a shaping station including a shaping machine and a transfer device for the carcass, which can be moved along a transfer path, in particular a linear transfer path.

BACKGROUND OF THE INVENTION

The prior art includes the practice of producing a carcass without sidewalls on a cylindrical building drum, wherein at least one carcass inlay is wound and spliced, after which annular reinforcing structures with bead cores are placed and the ply turnups are created. For the application of the sidewalls and the subsequent transfer of the carcass to the shaping machine, the known process requires multiple transfers of the carcass and the use of several corresponding transfer devices. This prejudices efficient progress of the buildup process and the outlay on machinery is high.

SUMMARY OF THE INVENTION

It is an object of the invention to provide a method and a system of the type stated at the outset, by which carcass buildup can take place in a significantly more efficient way: in particular, to manufacture tires of different configurations, for example, tires with different carcass ply turnup lengths and carcass ply embodiments or combinations.

As to the method, the stated object is achieved, according to the invention, by virtue of the fact that the carcass produced without sidewalls is transferred to a transfer device, and remains thereon both as the sidewalls are being fitted and also as it is being subsequently transferred to the shaping machine.

According to the invention, the system is characterized in that the apparatus for the separate application of the sidewalls is a sidewall station positioned between the carcass station and the shaping station and including two sidewall drums. The drums can be moved parallel to the transfer path on a mount, wherein the sidewall drums together with the mount can be moved along a frame into and out of the transfer path.

According to the invention, the carcass therefore remains on a single transfer device, starting with its being built up without sidewalls, to the point where it is transferred to the shaping machine. Time-consuming transfer steps to different devices involving a high outlay on machinery are thus eliminated. While the carcass produced is being transferred and provided with the sidewalls, the next carcass can already be in the process of being built up at the carcass station of the system. It is therefore possible to produce tire carcasses very efficiently and in a time-saving and cost-saving manner by means of the invention.

The method is particularly efficient and time-saving if the sidewalls are applied as annularly encircling mixture strips on sidewall drums by a sidewall servicer at a separate sidewall station, the transfer device together with the carcass is moved in front of the sidewall station, the sidewall drums are moved coaxially up to the carcass for the purpose of tacking on the sidewalls and, after the sidewalls have been tacked on, are moved away from the carcass. The sidewalls have therefore already been prepared as annularly encircling components on the sidewall drums when the transfer device together with the carcass is being moved to the sidewall station.

A particularly durable product is achieved if the sidewalls are tacked to the inner liner of the carcass in the region radially to the inside of the bead cores.

For a simple structural embodiment of the transport apparatus for the transfer device, it is advantageous if the transfer device is moved from the carcass station to the shaping machine along a linear transfer path.

On the shaping apparatus, the sidewalls are folded over and moved into their final position. During this process, the carcass together with the tacked-on sidewalls is transferred to a shaping drum, allowing the transfer device or carcass support ring to be moved back to the carcass station even during the shaping operation.

A variant of the method according to the invention, which likewise achieves the stated object, provides that the carcass produced without sidewalls is first of all moved into a second position while remaining on the carcass building drum, in which position the sidewalls are placed on and rolled on, wherein the carcass is then transferred to a transfer device and moved to the shaping machine.

According to the invention, the system is characterized in that the apparatus for the separate application of the sidewalls has a sidewall servicer, which is positioned adjacent to the carcass servicer, such that the carcass building drum can be moved with the built-up sidewall-free carcass by the carcass machine linearly with respect to the sidewall servicer.

In this alternative according to the invention too, the carcass is transferred to a transfer device just once. This method and this system therefore likewise allow efficient and cost saving manufacture of tire carcasses of different configurations.

BRIEF DESCRIPTION OF THE DRAWINGS

The invention will now be described with reference to the drawings wherein.

DESCRIPTION OF THE PREFERRED EMBODIMENTS OF THE INVENTION

The method according to the invention relates to the production of any pneumatic vehicle tire of radial construction, especially for passenger vehicles. In the description of the buildup method with reference to FIGS. 1 to 9, mention is made of tire components which are for the most part not shown in FIGS. 1 to 9. These components and the positioning thereof in the finished pneumatic vehicle tire will now be explained by way of example with reference to FIG. 10.

Figure 10:
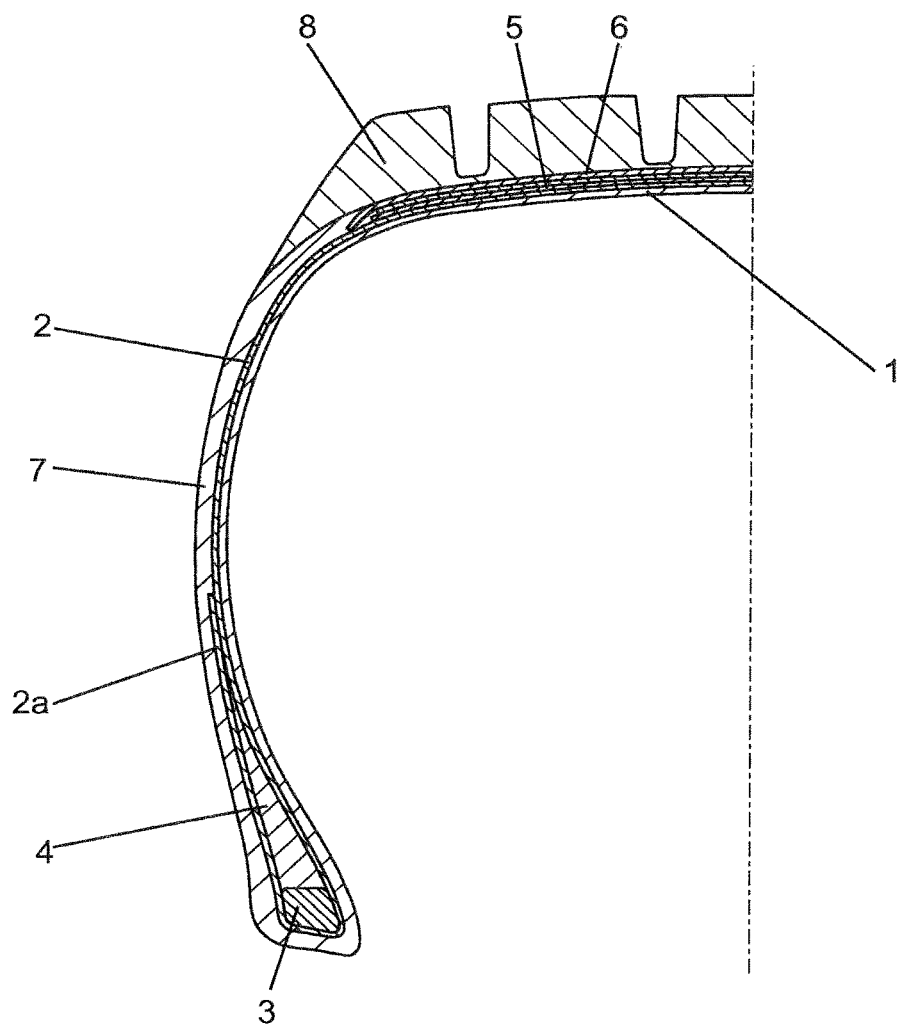
FIG. 10 shows a simplified partial cross section through a pneumatic radial tire for a passenger vehicle.

The radial pneumatic tire shown in FIG. 10 has an airtight inner liner 1, a carcass inlay 2, bead regions with bead cores 3 and core fillers 4, a belt consisting of a plurality of belt plies 5 and a belt bandage 6, and furthermore sidewalls 7 and a tread rubber 8. The carcass inlay 2 consists of one ply or a plurality of plies of textile or metal cords, which are embedded in a known manner in a rubber mixture and extend at least substantially in a radial direction from bead region to bead region. The end portions of the carcass inlay 2 are folded around the bead cores 3 from axially on the inside to axially on the outside and form the turnups 2a (ply turnups) extending along the sidewalls 7. The core fillers 4 situated on the bead cores 3 are rubber profiles, wherein more than one core filler can be provided for each bead core 3. During the production of the pneumatic vehicle tire from the individual components, the bead cores 3 are generally preproduced as units together with the unvulcanized core fillers 4. These units can be provided on the outside with one ply or with a plurality of plies of bead protection strips and the like. Depending on the type of tire, further components which are not shown, for example, belt cushions, can be installed in the tire.

The invention is concerned with the building up of the so-called carcass, which comprises, except for the tread rubber and the belt assembly (including the bandages), the other tire components, these including, according to the example shown in FIG. 10, the inner liner 1, the carcass inlay 2, the bead cores 3 with core fillers 4 and the sidewalls 7. To finish the tire, the tire carcass is bonded to the belt assembly and the tread rubber in a known manner. The method steps associated therewith are not part of the invention.

In the following description, information such as "right", "left", "from left to right" and "from right to left" refers to the positions shown in the figures, while "forward" denotes a direction of motion in the direction of the bottom edge of the page and "backward" denotes a direction of motion in the direction of the top edge of the page.

Figure 1:
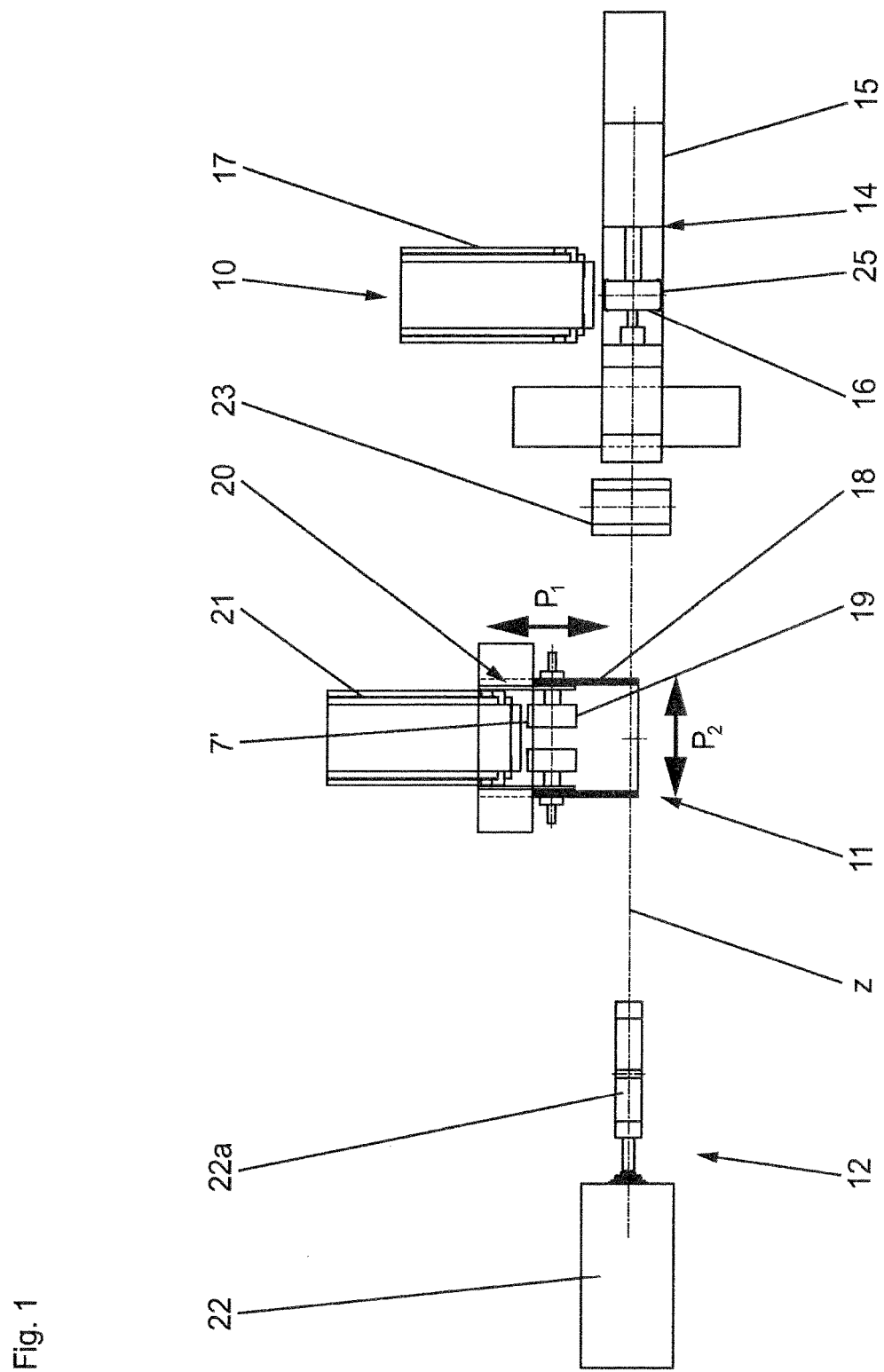
FIGS. 1 to 7 show individual steps of an embodiment of the method according to the invention by schematics.

FIGS. 1 to 9 show plan views of work stations of a system for building up the carcass of a pneumatic vehicle tire. As FIG. 1 shows, for example, these work stations include, from right to left, a carcass station 10, a sidewall station 11 and a shaping station 12. A transfer device 23 can be moved between the individual stations along a transfer path (z), in particular a rectilinear transfer path.

The carcass station 10 has a base frame 14, which is approximately T-shaped in plan view, and a carcass machine 15 comprising a carcass building drum 16 and a carcass servicer 17. The sidewall station 11 has a sidewall servicer 21 and a base frame 18, on which a mount 20 can be moved forward and backward (double arrow $P_1$) and therefore into and out of the transfer path (z). Two sidewall drums 19 are arranged on the mount in such a way that they can be moved toward and away from one another and thus parallel to the transfer path (z) (double arrow $P_2$).

The shaping station 12 has a shaping machine 22 with a shaping drum 22a embodied in a manner known per se. The transfer path (z) extends along the central axis of the system, along which the transfer device, in particular a carcass support ring 23 known per se, is moved into different positions, as will be described below. The transfer system for the carcass support ring 23 is preferably guided above the work stations, parallel to the transfer path (z).

A variant of the production of the carcass of a pneumatic vehicle tire will now be described in detail by means of FIGS. 1 to 7.

In the first step, shown in FIG. 1, the carcass building drum 16 is positioned in front of the carcass servicer 17. Here, all the components of the carcass, with the exception of the two sidewalls, are placed or wound onto the building drum 16 in a known manner by the carcass servicer 17. While the carcass 25 comprising the bead cores, the inner liner and at least one carcass ply is being produced and the ply turnups are being carried out, a sidewall 7', which forms an annularly encircling component on the corresponding sidewall drum 19, is already being wound onto each of the two sidewall drums 19, which have been moved into their work position relative to the sidewall servicer 21.

Figure 2:
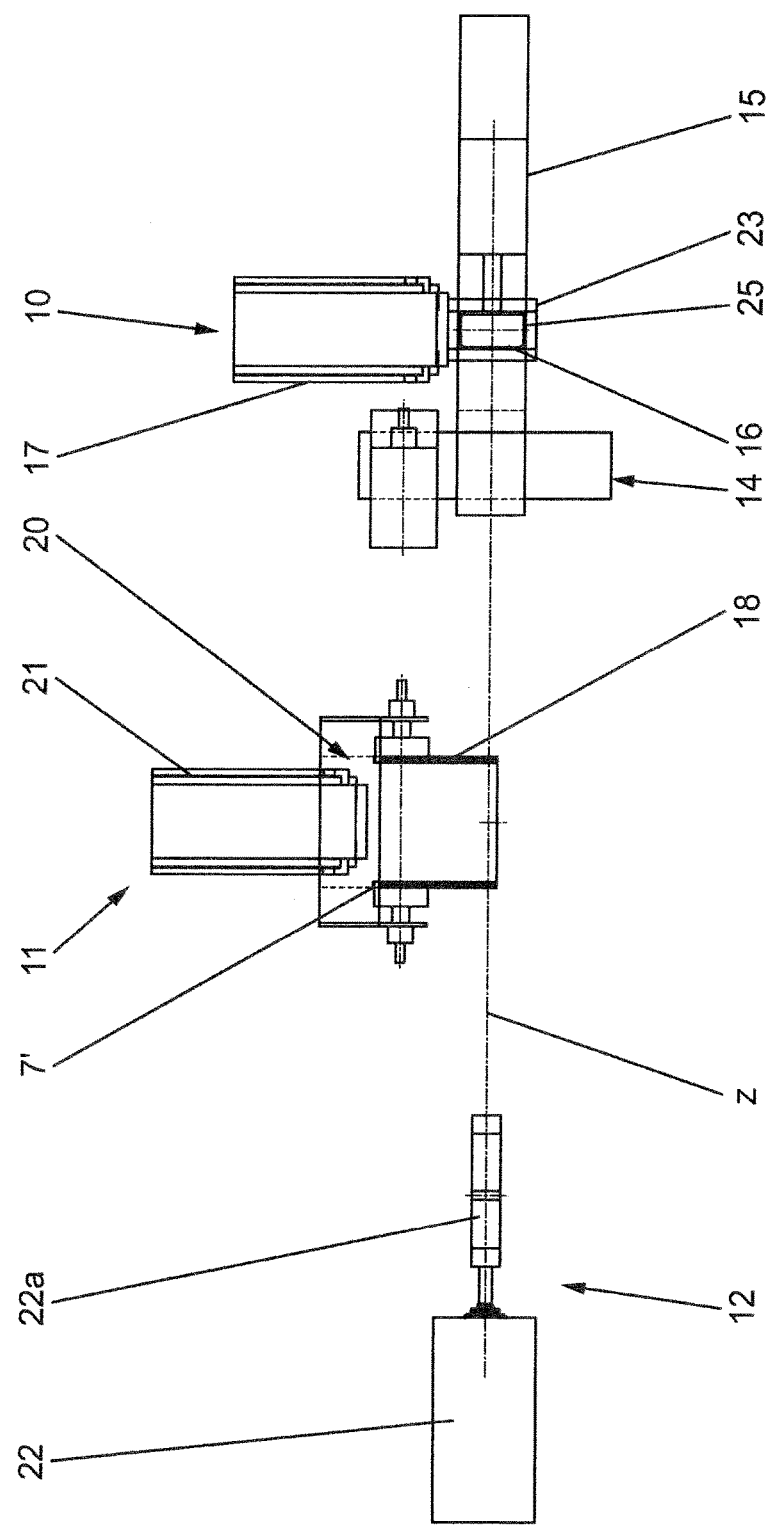
Figure 3:
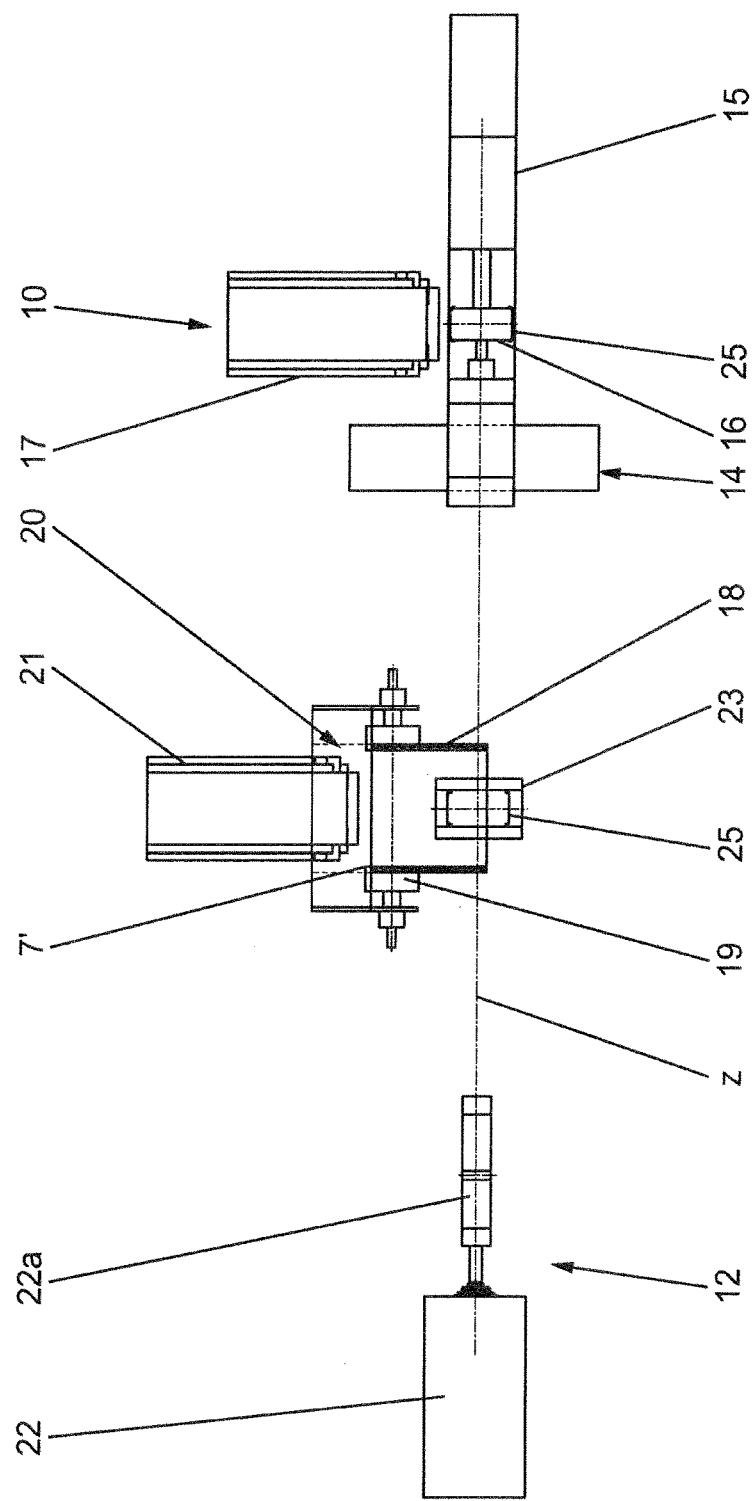
Figure 4:
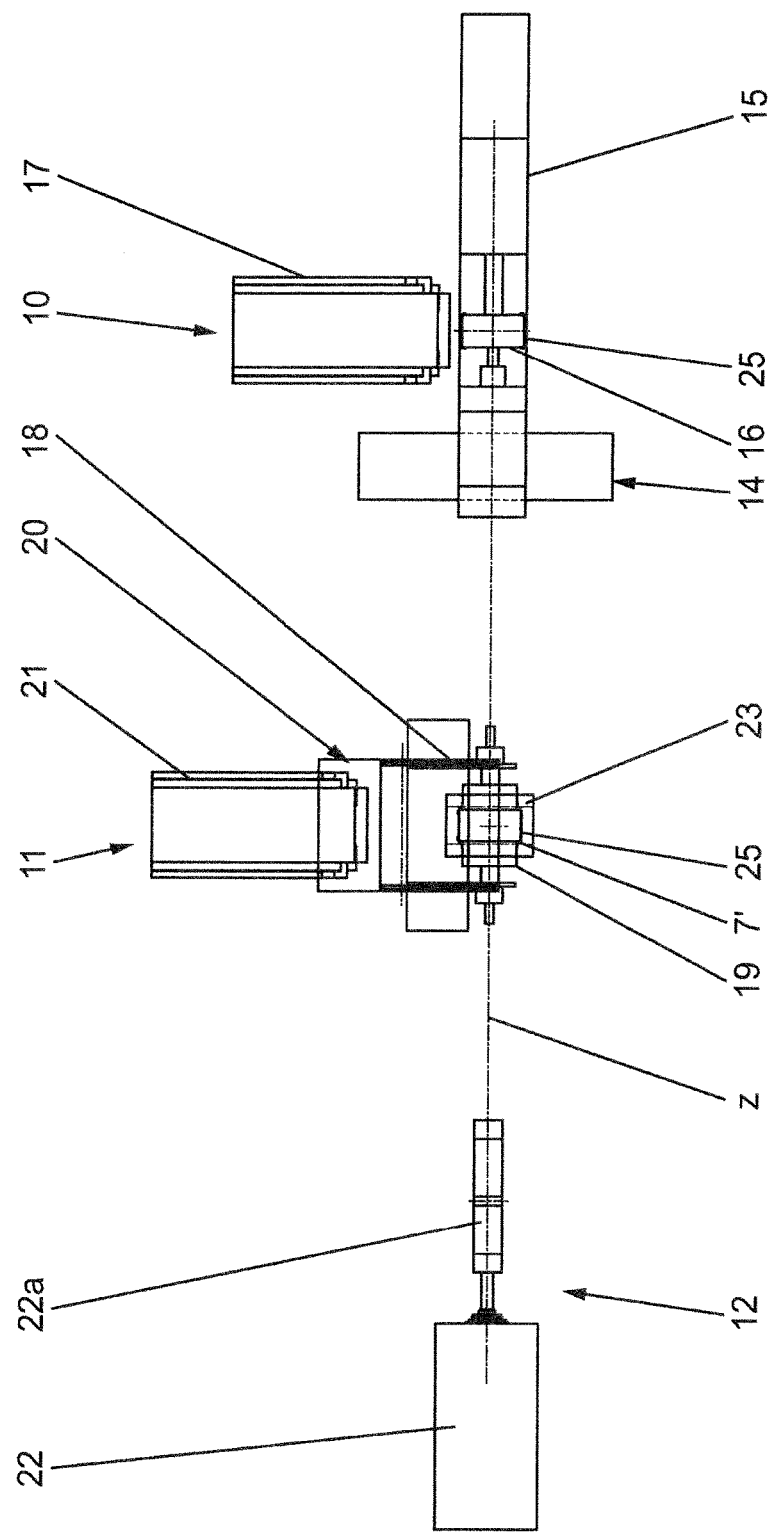
Figure 5:
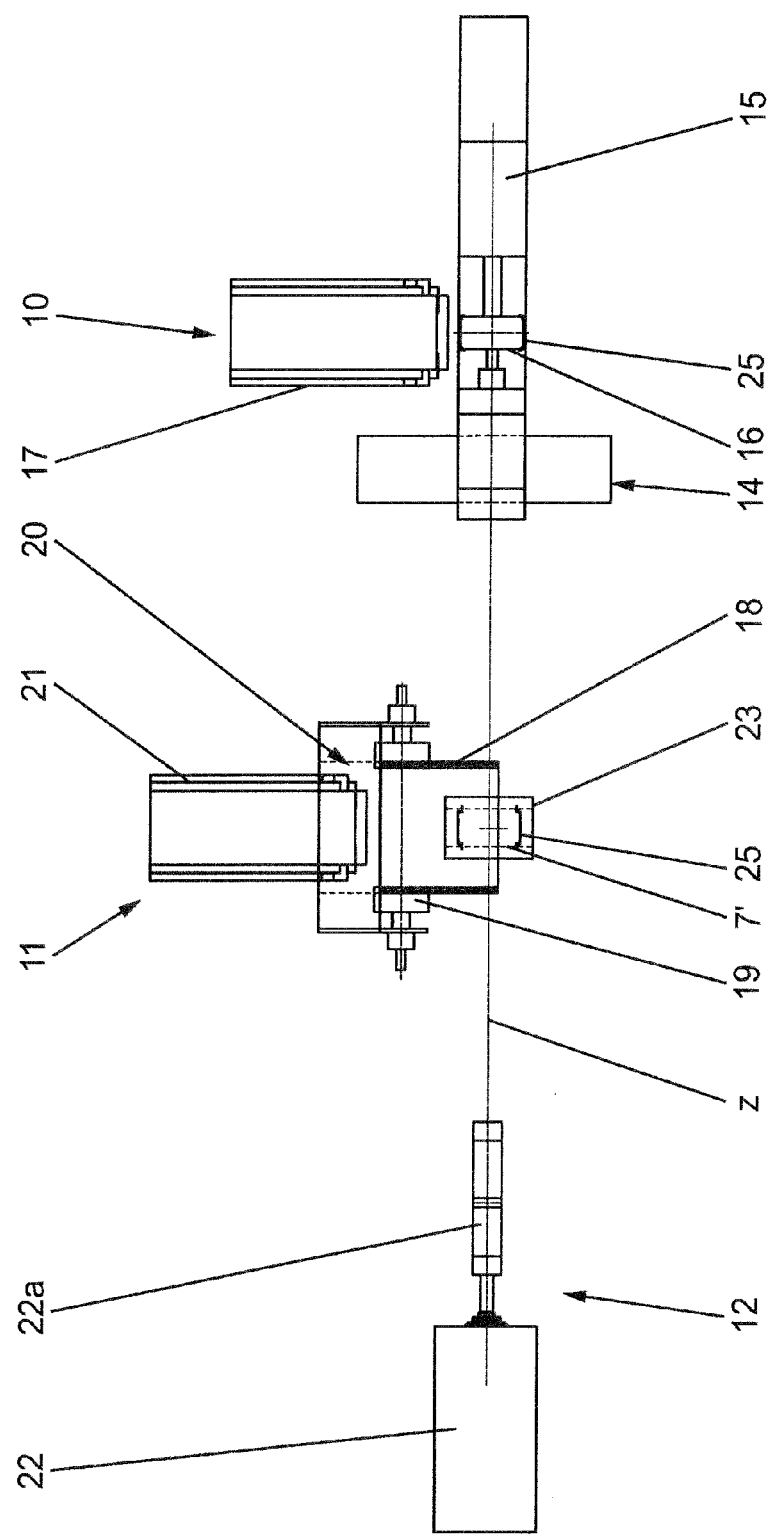

In the next step, which is shown in FIG. 2, the carcass support ring 23 is moved over the built-up carcass 25, and the carcass support ring 23 takes over the carcass 25 from the carcass building drum 16 and transports the carcass 25 to the left into a position in front of the sidewall servicer 21. Here, in the meantime, the two sidewall drums 19 have been moved apart on the mount 20 (FIGS. 2 and 3). The mount 20 then moves forward on the base frame 18 until the two sidewall drums 19 are coaxial with the carcass support ring 23 and hence with the carcass 25. The two sidewall drums 19 are moved laterally up to the carcass 25, and the two sidewalls 7' are tacked or clamped to the carcass 25, in particular, to the inner liner radially to the inside of the bead cores. This situation is shown in FIG. 4. The two sidewall drums 19 are moved apart and moved backward together with the mount 20. FIG. 5 shows this position and the carcass 25, held by the carcass support ring 23, with the tacked-on sidewalls 7'.

Figure 6:
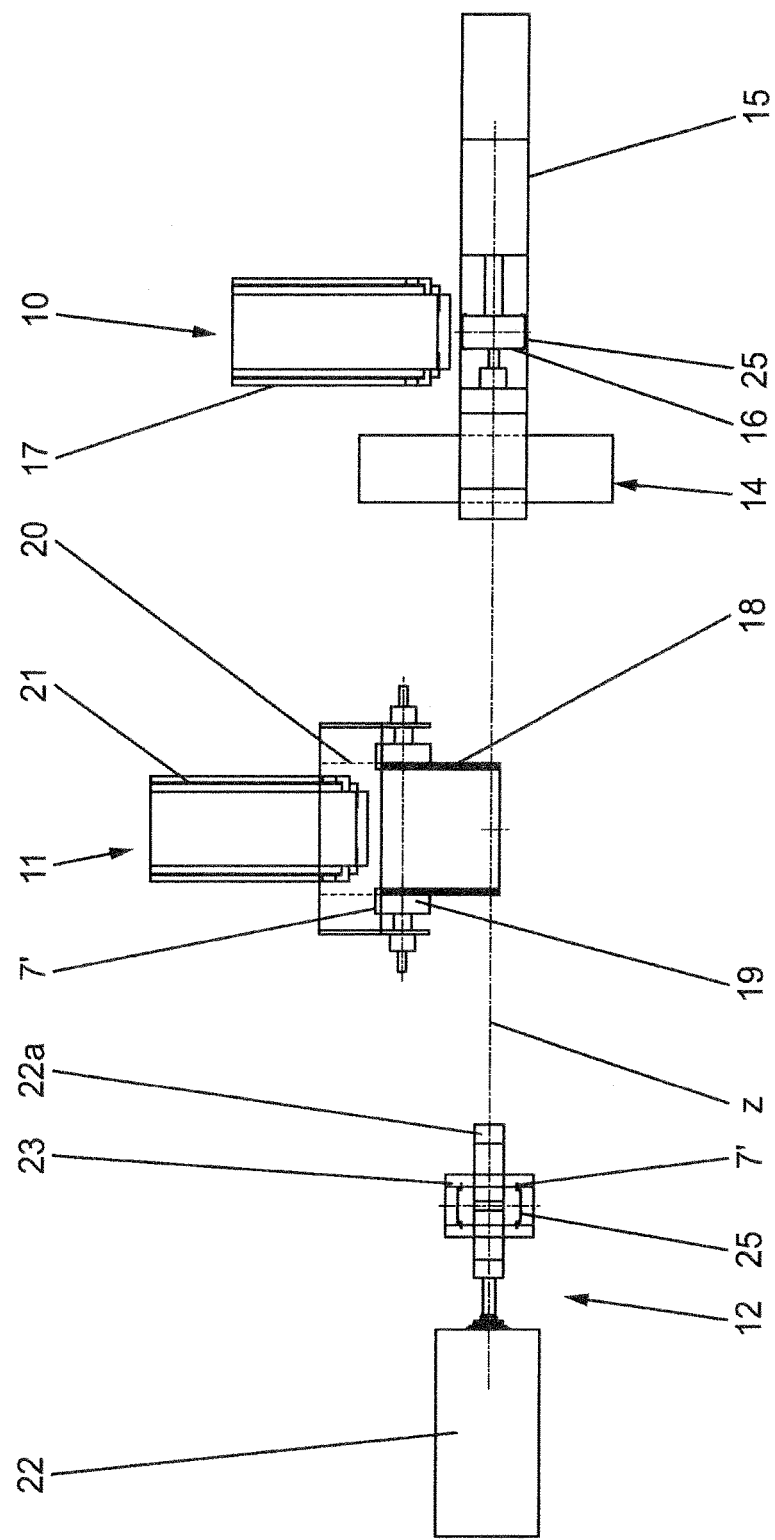
Figure 7:
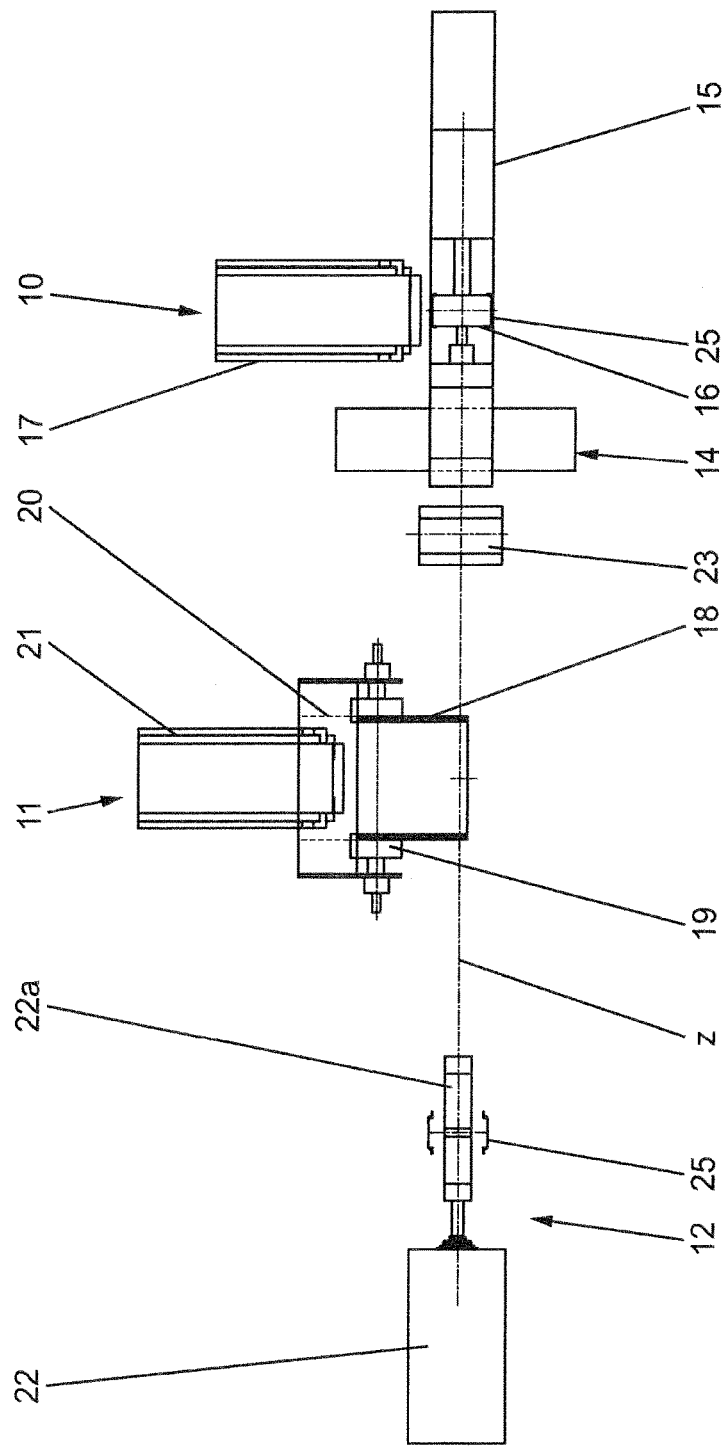

As soon as the transfer of the carcass 25 to the carcass support ring 23 is complete, the next carcass 25 can already be built up or wound on the carcass building drum 16. The carcass 25 provided with tacked-on sidewalls 7' is moved to the left to the shaping station 12 by the carcass support ring 23 and is positioned there on the shaping drum 22a (FIG. 6).

The shaping machine 22 shapes the carcass 25 in a known manner, wherein the sidewalls 7' are folded over and brought into their final position. The carcass finished in this way can be removed by means of a transfer device (not shown) and guided to the further steps for the production of the green tire. During the shaping operation, the carcass support ring 23 is already being brought back into its waiting position in front of the carcass station 10, and the sidewall drums 19 are being supplied with sidewalls, the next carcass 25 is being built up ready, transferred to the transfer device and brought to the sidewall station 11 for the purpose of tacking on the sidewalls 7'.

Figure 8:
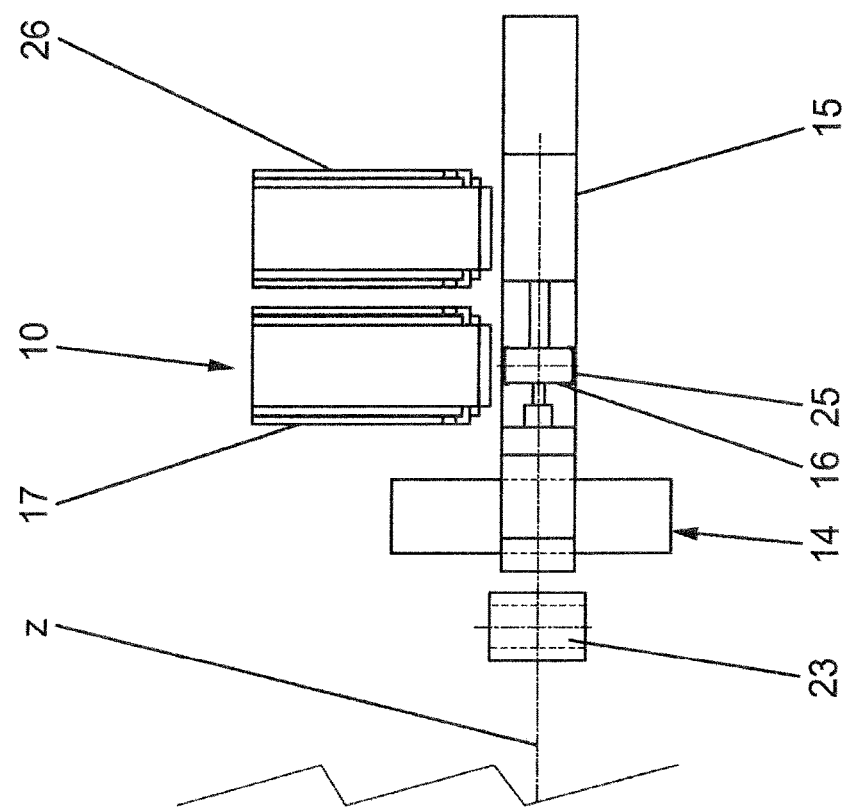
FIGS. 8 and 9 show another embodiment of the buildup method.
Figure 9:
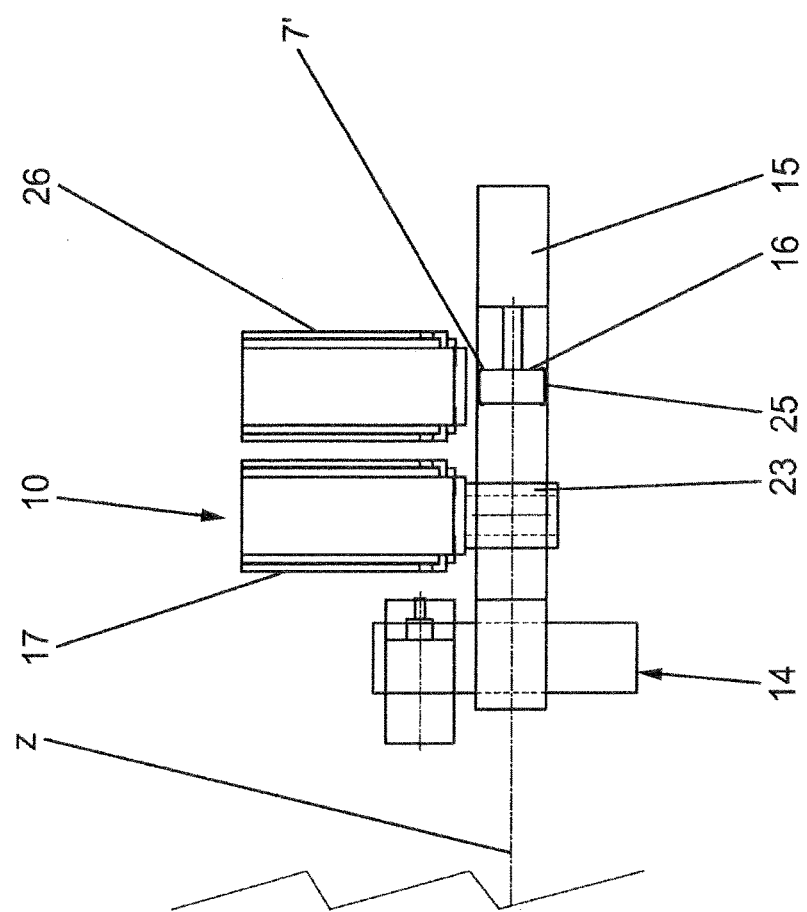

FIGS. 8 and 9 show another embodiment of the invention. Positioned at the carcass station 10 is a second servicer 26, which applies the sidewalls 7' to the carcass 25. For this purpose, the carcass building drum 16, together with the carcass 25 (FIG. 8), is moved linearly to the servicer 26 by the carcass machine 15. During this process, the carcass support ring 23 can already have been brought into a waiting position in front of the carcass servicer 17. In this case, a separate sidewall station 11 is not used. The carcass 25 is assembled with the sidewalls while the carcass support ring 23 remains in position at servicer 17. The carcass 25 is then taken over by the carcass support ring 23 and moved directly to the left to the shaping machine 22 (not shown in FIGS. 8 and 9).

It is understood that the foregoing description is that of the preferred embodiments of the invention and that various changes and modifications may be made thereto without departing from the spirit and scope of the invention as defined in the appended claims.

LIST OF REFERENCE NUMBERS 1 inner liner
2 carcass inlay
2a turnups
3 bead cores
4 core fillers
5 belt plies
6 belt bandage
7 sidewalls
7' sidewalls
8 tread rubber
10 carcass station
11 sidewall station
12 shaping station
14 base frame
15 carcass machine
16 carcass building drum
17 carcass servicer
18 base frame
19 sidewall drums
20 mount
21 sidewall servicer
22 shaping machine
22a shaping drum
23 carcass support ring
25 carcass
26 servicer
P$_1$ double arrow
P$_2$ double arrow
z transfer path

What is claimed is:

1. A method for making a carcass for a pneumatic vehicle tire:

providing a belt assembly and a tread rubber;
building up a carcass that is free from sidewalls and has an inner liner, wherein the carcass comprises a single-ply or multi-ply carcass inlay and bead cores, wherein the carcass is built up at a carcass station on a carcass building drum;
forming ply turnups around the bead cores on the carcass building drum;
transferring the carcass produced without sidewalls to a transfer device;
keeping the carcass on the transfer device while applying sidewalls to the carcass;
retaining the carcass on the transfer device while transferring the carcass provided with the sidewalls to a shaping machine;
shaping the carcass into a toroidal shape;
bonding the belt assembly and the tire rubber to the shaped carcass thereby forming a green tire;
wherein the transfer device is moved from the carcass station to the shaping machine along a linear transfer path (z) with the carcass remaining on the transfer device continuously starting at the carcass station to the shaping machine; and,
moving the transfer device back to the carcass station during the shaping operation.

2. A method for making a carcass for a pneumatic vehicle tire:

providing a belt assembly and a tread rubber;
building up a carcass that is free from sidewalls and has an inner liner, wherein the carcass comprises a single-ply or multi-ply carcass inlay and bead cores, wherein the carcass is built up at a carcass station on a carcass building drum;
forming ply turnups around the bead cores on the carcass building drum;
transferring the carcass produced without sidewalls to a transfer device;
keeping the carcass on the transfer device while applying sidewalls to the carcass;
retaining the carcass on the transfer device while transferring the carcass provided with the sidewalls to a shaping machine;
shaping the carcass into a toroidal shape;
bonding the belt assembly and the tire rubber to the shaped carcass thereby forming a green tire;
wherein the transfer device is moved from the carcass station to the shaping machine along a linear transfer path (z) with the carcass remaining on the transfer device continuously starting at the carcass station to the shaping machine;
wherein the sidewalls are applied as annularly encircling mixture strips on respective sidewall drums by a sidewall servicer at a sidewall station located along the linear transfer path (z) between the carcass station and the shaping machine;
wherein the transfer device together with the carcass is moved in front of the sidewall station and the sidewall drums are moved coaxially up to the carcass and the sidewalls are tacked onto the carcass;
wherein, after the sidewalls are tacked on, the sidewall drums are moved away from the carcass; and,
moving the transfer device back to the carcass station during the shaping operation.

3. A method for making a carcass for a pneumatic vehicle tire:

providing a belt assembly and a tread rubber;
building up a carcass that is free from sidewalls and has an inner liner, wherein the carcass comprises a single-ply or multi-ply carcass inlay and bead cores, wherein the carcass is built up at a carcass station on a carcass building drum;
forming ply turnups around the bead cores on the carcass building drum;
transferring the carcass produced without sidewalls to a transfer device;
keeping the carcass on the transfer device while applying sidewalls to the carcass;
retaining the carcass on the transfer device while transferring the carcass provided with the sidewalls to a shaping machine;
shaping the carcass into a toroidal shape;

bonding the belt assembly and the tire rubber to the shaped carcass thereby forming a green tire;

wherein the transfer device is moved from the carcass station to the shaping machine along a linear transfer path (z) with the carcass remaining on the transfer device continuously starting at the carcass station to the shaping machine;

moving the transfer device back to the carcass station during the shaping operation; and, wherein the sidewalls are each tacked to the inner liner of the carcass in a region radially within the bead cores.

4. The method of claim 1, wherein the sidewalls are folded over on the shaping machine and brought into their final position.

5. The method of claim 1, wherein said transfer device is a carcass support ring.

6. The method of claim 2, wherein said transfer device is a carcass support ring.

7. The method of claim 3, wherein said transfer device is a carcass support ring.

* * * * *